US009532114B2

United States Patent
Swaminathan et al.

(10) Patent No.: US 9,532,114 B2
(45) Date of Patent: *Dec. 27, 2016

(54) OPTIMIZING CACHES FOR MEDIA STREAMING

(71) Applicant: Adobe Systems Incorporated, San Jose, CA (US)

(72) Inventors: Viswanathan Swaminathan, Saratoga, CA (US); Srinivas R. Manapragada, San Ramon, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,849

(22) Filed: Dec. 17, 2015

(65) Prior Publication Data
US 2016/0105732 A1 Apr. 14, 2016

Related U.S. Application Data

(63) Continuation of application No. 12/789,406, filed on May 27, 2010, now Pat. No. 9,253,548.

(51) Int. Cl.
*H04N 21/845* (2011.01)
*H04N 21/647* (2011.01)
(Continued)

(52) U.S. Cl.
CPC ........... *H04N 21/8456* (2013.01); *G11B 27/10* (2013.01); *H04N 21/2183* (2013.01);
(Continued)

(58) Field of Classification Search
None
See application file for complete search history.

(56) References Cited

U.S. PATENT DOCUMENTS 5,956,716 A    9/1999  Kenner et al.
6,230,200 B1   5/2001  Forecast et al.
(Continued)

OTHER PUBLICATIONS

"Final Office Action", U.S. Appl. No. 12/789,406, Jun. 5, 2013, 21 pages.
(Continued)

*Primary Examiner* — Greg C Bengzon
(74) *Attorney, Agent, or Firm* — Wolfe-SBMC

(57) ABSTRACT

Methods, systems, and apparatus, including computer programs encoded on a computer storage medium, are described for establishing a grouping rule and a mapping protocol at a cache server system for caching fragments of a media stream that includes a timed-sequence of video frames. The fragments can be generated and identified at media source systems in accordance with a fragmenting format and an indexing protocol, respectively, which are common across the media source systems. Further, the established mapping protocol can be different from the indexing protocol. The methods include retrieving at least a portion of the fragments of the media stream by the cache server system from the media source systems. The methods also include allocating the retrieved fragments to local fragment groups at the cache server system based on the established grouping rule. The methods further include mapping the allocated fragments to the local fragment groups based on the established mapping protocol.

20 Claims, 7 Drawing Sheets

(51) Int. Cl.
- *G11B 27/10* (2006.01)
- *H04N 21/2183* (2011.01)
- *H04N 21/242* (2011.01)
- *H04N 21/43* (2011.01)
- *H04N 21/45* (2011.01)
- *H04N 21/854* (2011.01)

(52) U.S. Cl.
CPC ....... *H04N 21/242* (2013.01); *H04N 21/4302* (2013.01); *H04N 21/4532* (2013.01); *H04N 21/64738* (2013.01); *H04N 21/64761* (2013.01); *H04N 21/64784* (2013.01); *H04N 21/85406* (2013.01)

(56) References Cited

U.S. PATENT DOCUMENTS

| | | |
|---|---|---|
| 6,496,980 B1 | 12/2002 | Tillman et al. |
| 6,834,329 B2 | 12/2004 | Sasaki et al. |
| 7,039,766 B1 | 5/2006 | Smith |
| 7,237,061 B1 | 6/2007 | Boic |
| 7,324,555 B1 | 1/2008 | Chen et al. |
| 7,386,662 B1 | 6/2008 | Kekre et al. |
| 7,394,817 B2 | 7/2008 | Yap |
| 7,428,573 B2 | 9/2008 | McCanne et al. |
| 7,779,096 B2 | 8/2010 | Cherkasova |
| 7,870,279 B2 | 1/2011 | Chuang et al. |
| 8,099,548 B2 | 1/2012 | Davis |
| 8,117,396 B1 | 2/2012 | Fair et al. |
| 8,230,161 B2 | 7/2012 | Chu |
| 8,312,219 B2 | 11/2012 | Cher et al. |
| 8,892,691 B2 * | 11/2014 | Pantos ............... G06F 17/30053 709/219 |
| 9,015,198 B2 | 4/2015 | Osmond |
| 9,038,116 B1 * | 5/2015 | Knox ................ H04L 12/2805 709/219 |
| 9,253,548 B2 | 2/2016 | Swaminathan et al. |
| 9,380,096 B2 * | 6/2016 | Luby ................ H04N 21/23106 |
| 2002/0056025 A1 | 5/2002 | Qiu et al. |
| 2003/0191812 A1 | 10/2003 | Agarwalla et al. |
| 2003/0196060 A1 | 10/2003 | Miller |
| 2003/0236961 A1 | 12/2003 | Qiu et al. |
| 2004/0052501 A1 | 3/2004 | Tam |
| 2004/0098363 A1 | 5/2004 | Anglin et al. |
| 2006/0206662 A1 | 9/2006 | Ludwig et al. |
| 2006/0279628 A1 * | 12/2006 | Fleming ............... G11B 27/034 348/143 |
| 2007/0245090 A1 | 10/2007 | King et al. |
| 2008/0005163 A1 * | 1/2008 | Bauchot ............ G06F 17/30902 |
| 2008/0028153 A1 | 1/2008 | Marwinski |
| 2008/0147974 A1 | 6/2008 | Madison et al. |
| 2008/0162713 A1 | 7/2008 | Bowra et al. |
| 2009/0037382 A1 * | 2/2009 | Ansari ............. G06F 17/30749 |
| 2009/0063542 A1 | 3/2009 | Bull et al. |
| 2010/0049921 A1 | 2/2010 | Aronovich et al. |
| 2010/0131671 A1 | 5/2010 | Kohli et al. |
| 2010/0161756 A1 | 6/2010 | Lewis et al. |
| 2010/0179865 A1 | 7/2010 | Lundqvist et al. |
| 2010/0195974 A1 | 8/2010 | Zheng et al. |
| 2010/0223429 A1 | 9/2010 | Cher et al. |
| 2010/0235438 A1 | 9/2010 | Narayanan et al. |
| 2010/0235542 A1 * | 9/2010 | Visharam ................ G06F 15/16 709/246 |
| 2010/0241726 A1 | 9/2010 | Wu |
| 2011/0010514 A1 | 1/2011 | Benhase et al. |
| 2011/0080940 A1 * | 4/2011 | Bocharov .......... H04N 21/4331 375/240.01 |
| 2011/0083144 A1 * | 4/2011 | Bocharov .......... H04N 7/17318 725/32 |
| 2011/0096828 A1 * | 4/2011 | Chen ................ H04N 21/23106 375/240.02 |
| 2011/0107030 A1 | 5/2011 | Borst et al. |
| 2011/0131298 A1 | 6/2011 | Courtemanche et al. |
| 2011/0145330 A1 | 6/2011 | Sundarrajan et al. |
| 2011/0161557 A1 | 6/2011 | Haines et al. |
| 2011/0185041 A1 | 7/2011 | Hunt |
| 2011/0231519 A1 * | 9/2011 | Luby ................ H04N 21/23106 709/219 |
| 2011/0238789 A1 | 9/2011 | Luby et al. |
| 2011/0246491 A1 | 10/2011 | Clash et al. |
| 2011/0246659 A1 * | 10/2011 | Bouazizi ........... H04N 21/2343 709/231 |
| 2011/0258391 A1 | 10/2011 | Atkisson et al. |
| 2011/0307545 A1 * | 12/2011 | Bouazizi ........ H04N 21/234345 709/203 |
| 2012/0005431 A1 | 1/2012 | Gross et al. |
| 2012/0084392 A1 | 4/2012 | Lipfert et al. |
| 2012/0246279 A1 | 9/2012 | Zang et al. |
| 2012/0265895 A1 | 10/2012 | Chen et al. |
| 2012/0269496 A1 | 10/2012 | Goldhor et al. |
| 2012/0290644 A1 * | 11/2012 | Gabin ................ H04L 65/4084 709/203 |
| 2013/0007223 A1 * | 1/2013 | Luby ................ H04N 21/23106 709/219 |
| 2013/0166625 A1 | 6/2013 | Swaminathan et al. |

OTHER PUBLICATIONS

"Final Office Action", U.S. Appl. No. 12/789,406, Sep. 30, 2014, 22 pages.

"Non-Final Office Action", U.S. Appl. No. 12/789,406, Jan. 7, 2013, 18 pages.

"Non-Final Office Action", U.S. Appl. No. 12/789,406, Apr. 11, 2014, 22 pages.

"Non-Final Office Action", U.S. Appl. No. 12/789,406, Apr. 22, 2015, 29 pages.

"Notice of Allowance", U.S. Appl. No. 12/789,406, Oct. 21, 2015, 12 pages.

* cited by examiner

OPTIMIZING CACHES FOR MEDIA STREAMING

This application is a continuation of, and claims priority to, pending U.S. patent application Ser. No. 12/789,406, filed May 27, 2010, the disclosure of which is incorporated in its entirety.

BACKGROUND

This specification relates to optimizing caches for streaming media streams within a content delivery network based on hypertext transfer protocol (HTTP.)

HTTP has become a standard protocol for Web communications. Consequently, technologies for optimizing HTTP delivery of content have been developed and have become available. Such optimized delivery has become widely accessible as it relies mostly on standard HTTP servers that are widely supported in content delivery networks.

The basic principles of HTTP streaming involve using software on an origin server of a content delivery network to break a media stream into small fragments (also referred to as segments) saved as separate files, and to create a play list for informing a media player client where to get the files that make up a complete media stream. The media player client can download the files and can play the small fragments included in the downloaded files in an order specified by the playlist. When too many media player clients send download requests to the origin server at the same time, the existing bandwidth and system resources of the origin server can be overwhelmed.

Edge servers of a content delivery network that are connected to the origin server can mitigate this problem by aggregating download requests, e.g., each of the edge servers can multiplex connections from a large number of media player clients on to one connection to the origin server. Moreover, each of the edge servers can receive corresponding requested files from the origin server, and then can relay them to associated media player clients in response to their respective download requests. Additionally, each edge server can be configured to cache the files received from the origin server by aggregating the files to be cached into local copies of media streams (e.g., complete copies of movies can be temporarily stored by an edge server) such that cached media streams can be made available to other media player clients that connect to the edge server.

SUMMARY

This specification describes technologies relating to optimizing performance of edge servers implemented as media cache server systems of a content delivery network for HTTP streaming of media content.

In general, one innovative aspect of the subject matter described in this specification can be embodied in methods that include the actions of establishing a grouping rule and a mapping protocol at a cache server system for caching fragments of a media stream that includes a timed-sequence of video frames. The fragments can be generated and identified at media source systems in accordance with a fragmenting format and an indexing protocol, respectively, which are common across the media source systems. Further, the established mapping protocol can be different from the indexing protocol. The methods include retrieving at least a portion of the fragments of the media stream by the cache server system from the media source systems. The methods also include allocating the retrieved fragments to local fragment groups at the cache server system based on the established grouping rule. The methods further include mapping the allocated fragments to the local fragment groups based on the established mapping protocol.

These and other implementations can include one or more of the following features. The fragments of the media stream can be identified by corresponding fragment numbers, and the local fragment groups can be identified by corresponding local group numbers. Establishing the mapping protocol can include determining a local group number of a local fragment group corresponding to an allocated fragment as a result of integer division between a corresponding fragment number and a predetermined group size, and determining an index within the local fragment group as the corresponding fragment number modulo the predetermined group size. Allocating the retrieved fragments can include creating a local fragment group having a local group number and appending a predetermined number of fragments from among the retrieved fragments to the local fragment group in retrieval order. Allocating the retrieved fragments can further include creating another local fragment group having a subsequent local group number and appending the predetermined number of fragments from among unallocated fragments of the retrieved fragments to the other local fragment group in retrieval order. Establishing the mapping protocol can include associating records of a data structure with allocated fragments. Each record can include a fragment number of an allocated fragment, a local group number of a corresponding local fragment group, and an index within the corresponding local fragment group.

In some implementations, the methods can include establishing the grouping rule for said allocating to form local fragment groups from fragments that have been preemptively retrieved from the media source systems. The preemptively retrieved fragments can have fragment numbers immediately following a fragment number requested by a client. The methods can also include establishing the grouping rule for forming local fragment groups from the retrieved fragments of the media stream including a media asset. The fragments can be encoded at different bit rates. Further, the methods can include storing the local fragment groups, on storage communicatively coupled with the cache server system, based on the grouping rule.

In some implementations, the methods can include establishing the grouping rule for forming local fragment groups from the retrieved fragments of the media stream including a media asset based on audience popularity of the allocated fragments. Storing the local fragment groups can include storing local fragment groups, including popular fragments, to a portion of the storage including a high speed I/O medium, and storing local fragment groups, including unpopular fragments, to another portion of the storage including a low speed I/O medium. Establishing the grouping rule can include allocating fragments of multiple media assets to form groups based on audience popularity of the allocated fragments. Establishing the grouping rule can also include allocating fragments of a movie to the local fragment groups, and can include storing the local fragment groups based on weighted grouping criteria including popularity of the movie, fragment positions within the movie, popularity of the fragments, encoding bit rate of the fragments, a storage medium's I/O speed. Storing can include incorporating the local fragment groups in respective files of a file system associated with the cache server system.

In some implementations, the methods implemented at a cache server system can include receiving a request from a client player device for a specified fragment. The methods can also include determining whether the specified fragment is stored by the cache server system. The methods can further include transmitting the specified fragment to the client player device in response to the request if the result is positive. Furthermore, if the result of the determination is negative, the methods can also include requesting the specified fragment from one of the media source systems, and pending the request of the client player device. In this case, the method can also include receiving the requested specified fragment from the one of the media source systems, and allocating the received specific fragment to a corresponding local fragment group based on the grouping rule. The methods can include transmitting the specific fragment to the client player device in response to the request.

In some implementations, the methods implemented at a media source system can include fragmenting the media stream in accordance with the fragmenting format. Fragmenting includes obtaining time references corresponding to the media stream and identifying key frames in the media stream. Each of the identified key frames can be a first key frame following a corresponding time reference from among the obtained time references. The fragmenting also includes generating fragments of the media stream corresponding to at least a portion of the identified key frames, respectively, and indexing the generated fragments in an index file in accordance with the indexing protocol. The methods implemented at the media source system further includes storing, on storage media communicatively coupled with the media source systems, the index file and the generated fragments for HTTP streaming.

Other implementations of this aspect include corresponding systems, apparatus, and computer programs, configured to perform the actions of the methods, encoded on computer storage devices.

According to another aspect, the described subject matter can also be implemented in a system including source systems configured to generate fragments of a video stream in accordance with a fragmenting format and an indexing protocol, which are common across the source systems. The system also includes multiple cache server systems communicatively coupled with the source systems via communication channels employing hypertext transmission protocol (HTTP). The multiple cache server systems can include respective storage devices. Further, the system also includes a client player device configured to play the video stream that is streamed from the source systems via one of the multiple cache server systems using HTTP. Each of the multiple cache server systems is configured to establish a grouping rule and a mapping protocol for caching the fragments of the video stream. The established mapping protocol can be different from the indexing protocol. Each of the multiple cache server systems is further configured to retrieve at least a portion of the fragments of the video stream from the source systems. Also, each of the multiple cache server systems is configured to allocate the retrieved fragments to local fragment groups based on the established grouping rule, and to map the allocated fragments to the local fragment groups based on the established mapping protocol. Further, each of the multiple cache server systems is configured to store the local fragment groups on an associated storage device based on the grouping rule.

Particular embodiments of the subject matter described in this specification can be implemented so as to realize one or more of the following advantages. A file load on a file system of an edge server can be reduced by caching, in a single corresponding file, multiple media stream fragments that have been allocated to a local fragment group. Further, locally established aggregation rules and corresponding local mapping protocols at the edge servers need not be identical to an indexing protocol used by an origin server (implemented as media source servers) of the content delivery network for HTTP streaming of media content. Therefore, an index that is locally created by the edge server can be non-exhaustive, unlike an exhaustive playlist maintained at the origin server, and can be used by the edge server to allocate and retrieve cached fragments of media streams without having to cache complete copies of the media streams.

Furthermore, by implementing locally established aggregation rules and corresponding local mapping protocols, the edge server can increase the effectiveness and efficiency of responding to client requests. For example, an edge server using the disclosed technology can service clients much faster. In addition, a number of clients serviced by each edge server can be increased resulting in overall scalability of the underlying content delivery network. Moreover, the edge servers using the disclosed systems and techniques can be can operate statelessly. For example, an edge server can use the locally established rules and corresponding mapping protocols without requiring preexisting information about a client or a source or how much content is available at one or more sources, and the like. Further, due to the stateless nature of the operation of edge servers in accordance with the techniques and systems disclosed in this specification, a number of edge servers can be brought online and taken off line based on demand for providing scalability and elasticity to the underlying content delivery network. The foregoing properties result in a robust way to service clients of a content delivery network which subscribes to the disclosed technologies.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
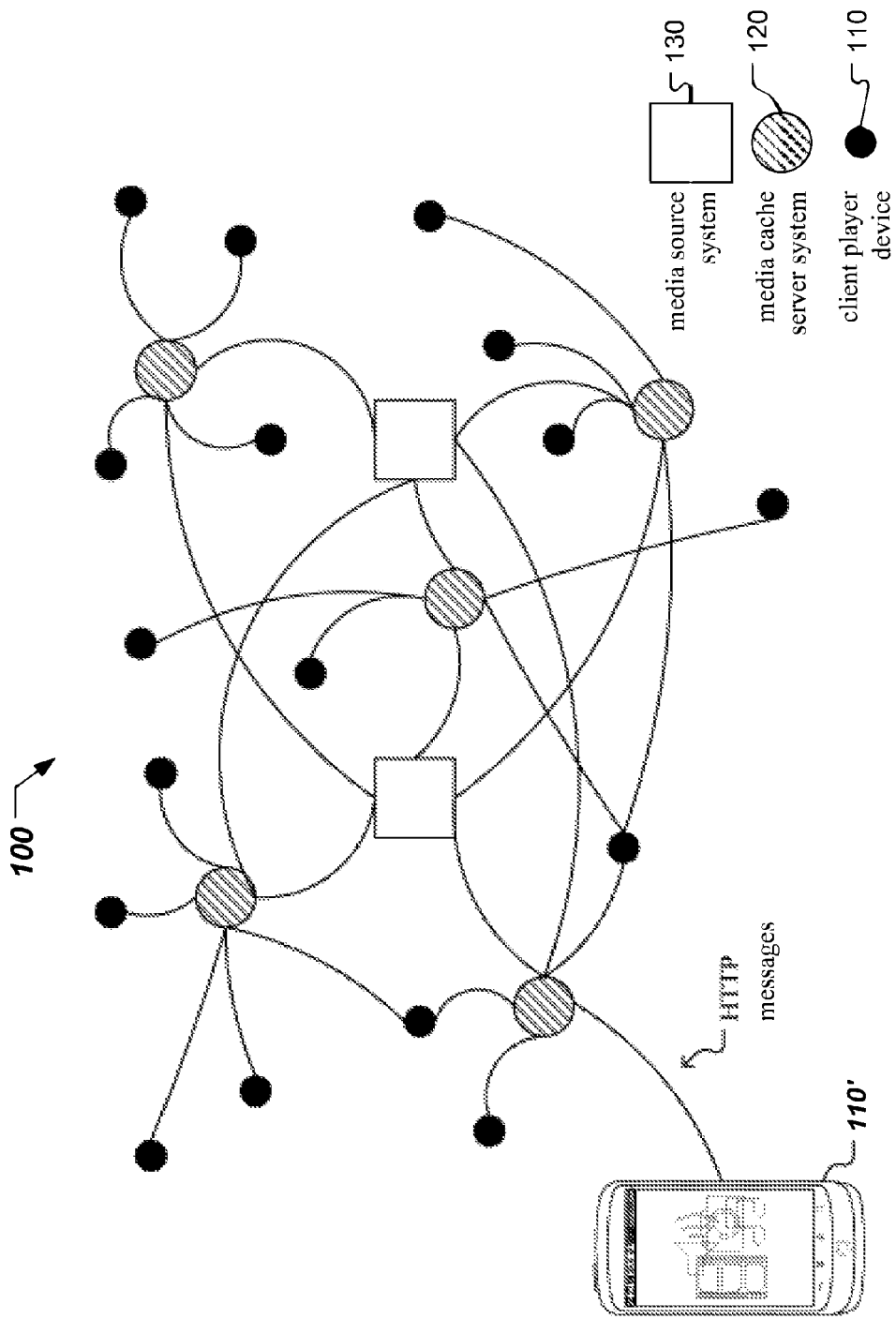
FIG. 1A shows a schematic representation of a system for media streaming.

FIG. 1A shows a schematic representation of an example of a content delivery network 100 for streaming media assets, e.g., video streams, audio streams, and the like. For example, a video stream includes a timed-sequence of key frames and intermediate frames. In accordance with moving picture experts group (MPEG) standards, key frames can include intra-coded frames (I-frames), and intermediate frames can include predictive-coded frames (P-frames) and bidirectionally-predictive-coded frames (B-frames). Content delivery network 100 can be operated based on a protocol for media streaming that includes streaming fragments of media assets via communication channels using hypertext transfer protocol (HTTP) messaging. Moreover, existing or future versions of HTTP can be used as communication protocols over the communication channels of content delivery network 100. These communication channels are represented by continuous lines in FIG. 1. Content delivery network 100 can have an architecture including origin servers and edge servers. The media fragments can be generated at media source systems 130 (origin servers) based on a fragmenting technique described below in connection with FIG. 1B. Media source systems 130 are illustrated diagrammatically as empty squares. Media source systems 130 can be communicatively coupled with multiple media cache server systems 120 (edge servers). Media cache server systems 120 are illustrated diagrammatically as pattern-filled circles. Client player devices 110 can communicate with media cache server systems 120, and can be configured to receive and to render media streams. Client player devices 110 can request media fragments from any one of the media source systems 130 via one of the media cache server systems 120 (e.g., via HTTP messages). Examples of client player devices, illustrated diagrammatically as black circles, include laptop computers, smartphones 110', set top boxes, and the like.

Figure 1B:
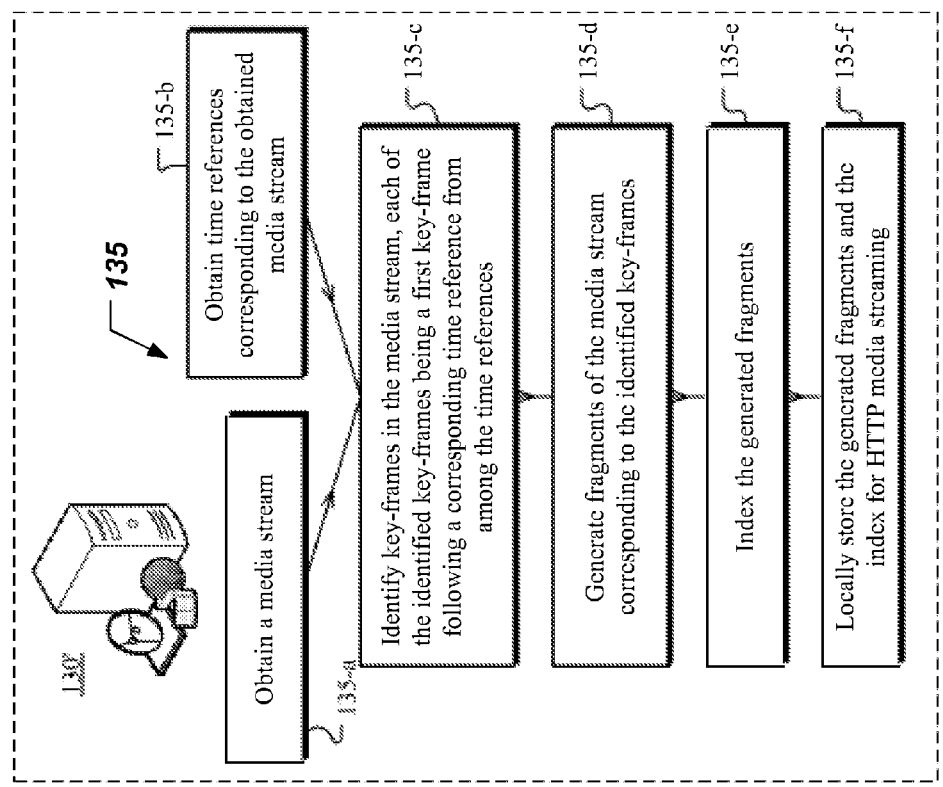
FIG. 1B shows an example of a method for generating time referenced fragments of a media stream.

FIG. 1B shows an example of a method 135 for fragmenting a media stream at a media source system 130'. Implementing method 135 across media source systems 130 can result in a common fragmenting format and a common indexing protocol for content delivery network 100. Method 135 includes obtaining 135-*a* a media stream. Media source system 130' can obtain 135-*a* the media stream from one or more cameras recording a live event. Additionally, or alternatively, media source system 130' can obtain 135-*a* the media stream by decoding a media file stored on a storage device of media source system 130' or connected thereto.

Method 135 further includes obtaining 135-*b* time references corresponding to the obtained media stream. In some implementations, obtaining 135-*b* the time references can include generating, by media source system 130', a sequence of reference times separated by a predetermined time interval, e.g., 4000 ms, to generate time references 0, 4000 ms, 8000 ms, 12000 ms, . . . Time "0" corresponds to the beginning (t=0) of the obtained media stream to be fragmented using method 135. The time references obtained in this manner can be, by definition, common across media source systems 130 of content delivery network 100. In other implementations, obtaining 135-*b* the time references can include receiving by all media source systems 130 a common sequence of time references, from the camera(s) recording the live event.

Method 135 includes identifying 135-*c*, by media source system 130', key frames in the media stream, such that each of the identified key frames is a first key frame following a corresponding time reference from among the obtained time references. Method 135 continues with media source system 130' generating 135-*d* fragments of the media stream corresponding to at least a portion of the identified key frames, respectively. Generating 135-*d* the fragments in this manner can enable a consistent fragmenting format across content delivery network 100, even for cases when media streams include key frames aperiodically distributed with respect to timing of the video stream. Each of the generated fragments can include an associated contiguous sequence of frames starting with the identified key frame. Further, a fragment followed by a gap between the fragment and a corresponding subsequent fragment can be dropped.

Method 135 also includes indexing 135-*e*, by media source system 130', the generated fragments in an index file according to an indexing protocol that is common across the content delivery network 100. In some implementations of the indexing protocol, the generated fragments can be accessed by respective fragment unique identifications (e.g., fragment names, fragment numbers, and the like). In other implementations of the indexing protocol, the generated fragments can be accessed by respective byte ranges. For example, an index file located at and updated by media source system 130' can include an exhaustive list of names of the fragments generated by media source system 130'. According to an indexing protocol that is common across content delivery network 100, associated index files, including similarly exhaustive lists of names of the fragments generated by media source systems 130, are also available at each of media source systems 130.

Method 135 further includes storing 135-*f*, on storage media communicatively coupled with media source system 130', the index file and the generated fragments for HTTP streaming. The storage media can be part of fast or slow access storage devices that are communicatively coupled with media source system 130'.

Method 135 can enable any one of media source systems 130 to generate the same fragment structure of a media stream, regardless of where the fragmenting is started in the media stream. Consequently for HTTP streaming of a live event, any one of media source systems 130 may start framing a live video stream sooner or later than its peers, and still come up with the same fragment structure of the video stream. This allows media cache server systems 120 to independently fetch fragments from any one of media source systems 130. Moreover for HTTP streaming of video on demand, a certain one of media source systems 130 may choose to fragment only a portion of a media asset. Independent of the portion selected, the fragment structure matches that which would have been created on all other ones of media source systems 130, and again this allows media cache server systems 120 to independently use fragments from each of media source systems 130.

In addition, method 135 can enable any one of media source systems 130 to generate a common fragmenting format, even when there are gaps (missing video frames) in a media stream. Consequently, a given one of media source systems 130 may stop fragmenting upon dropping the media stream, and later resume fragmenting upon re-obtaining the media stream, without a variation in fragment structure. This allows the given one of media source systems 130 to stay in the resource pool after a communication failure, and allows a media cache server system to fill in the gaps from alternate ones of media source systems 130.

This specification describes techniques implemented by media cache server systems 120 of content delivery network 100 to optimize caching media stream fragments that have been generated in accordance with method 135. Media cache server systems 120 that are optimized in this manner can potentially increase the effectiveness and efficiency of streaming the cached fragments over HTTP to client player devices 110. For example, a grouping rule and a corresponding mapping protocol that are applicable to fragments cached on one or more (and not necessarily all) of media cache server systems 120 can be generated. Notably, the mapping protocol can be different from the indexing protocol used by media source systems 130 and therefore, grouping of cached fragments can be optimized in accordance with conditions that are specific to each of media cache server systems 120, e.g., nature and/or volume of client requests, bandwidth of network traffic, and the like.

Figure 2:
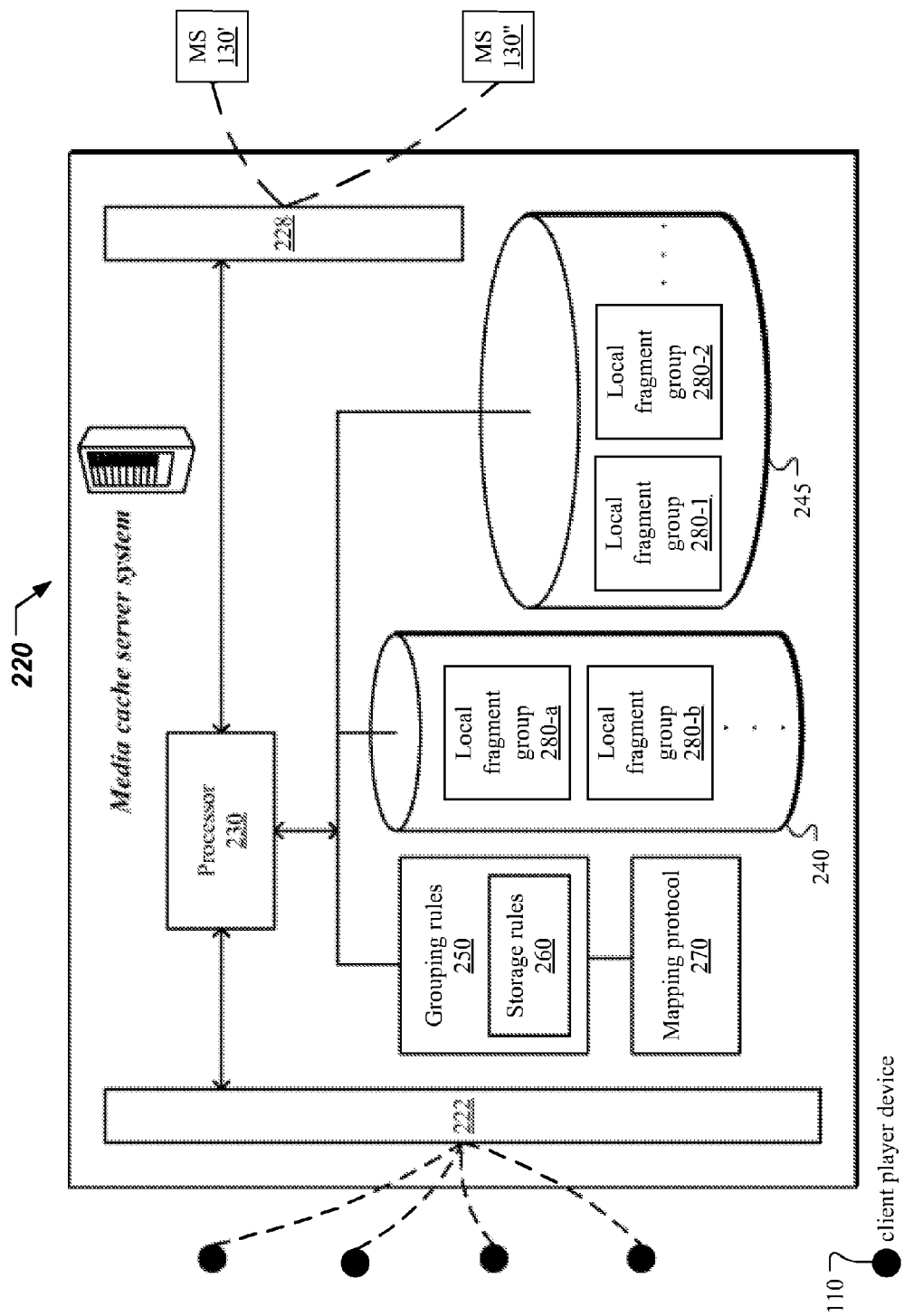
FIG. 2 shows a schematic diagram of an example of a system for caching media stream fragments.

FIG. 2 shows a schematic diagram of an example of a media cache server system 220 for caching fragments of media streams. Media cache server system 220 includes a processor 230 communicatively coupled with a first communication device 222 and with a second communication device 228. The first communication device 222 can be communicatively coupled with client player devices 110. The communication channels between media cache server system 220 and client player devices 110, represented by short-dashed lines, can be based on HTTP. The second communication device 228 can be communicatively coupled with media source systems 130', 130". The communication channels between media cache server system 220 and media source systems 130', 130", represented by long-dashed lines, can also be based on HTTP. In some implementations of media cache server system 220, the first and second communication devices 222, 228 can be one communication device (e.g., a single network interface card).

Processor 230 is configured to receive, from client player devices 110 via first communication device 222, requests for fragments of media streams. Processor 230 is further configured to fetch, via second communication device 228 from media source systems 130', 130", the requested fragments from media source systems 130', 130". The fragments fetched in this manner can be transmitted by media cache server system 220 to corresponding media player devices 110 in response to respective requests. Additionally, the fetched fragments can be cached by media cache server system 220 to local storage devices 240, 245 to be locally available for future client requests of the cached fragments. Storage device 240 can represent a slow access storage device (having a low speed input/output interface), e.g., a hard drive system. Storage device 245 can represent a fast access storage device (having a high speed input/output interface), e.g., a memory system.

Processor 230 can create local fragment groups (**280-*a*, 280-*b*, . . . , or 280-1, 280-2, . . . ) for caching fetched fragments based on grouping rules 250. Grouping rules 250 can be established by and maintained at media cache server system 220 in accordance with local conditions and needs for allocating the fetched fragments to corresponding local fragment groups (280-*a*, 280-*b*, . . . , or 280-1, 280-2, . . . ). Further, associated grouping rules 250 can be locally established by and maintained at each of media cache server systems 120 of content delivery network 100. For example, a local fragment group, 280-*j* (where j=1, 2, . . . , or a, b, . . . ) can include cached fragments of media streams. Newly fetched fragments can be allocated by processor 230 to an appropriate local fragment group 280-*j* based on grouping rules 250**.

Moreover, grouping rules 250 can include storage rules 260. Storage rules 260 can also be established by and maintained at media cache server system 220 in accordance with local conditions and needs. Processor 230 can appropriately choose a slow access storage device 240 to store some local fragment groups (**280-*a*, 280-*b*, . . . ) and a fast access storage device 245 to store certain other local fragment groups (280-1, 280-2, . . . ) based on storage rules 260. Multiple examples of grouping rules 250, including examples of storage rules 260, are described below in connection with FIG. 5**.

Further, processor 230 can establish and maintain a mapping protocol 270 to access fragments cached by media cache server system 220 in local fragment groups (**280-*a*, 280-*b*, . . . , or 280-1, 280-2, . . . ). Mapping protocol 270 can be established responsive to grouping rules 250 (including storage rules 260) applied by media cache server system 220 to create local fragment groups (280-*a*, 280-*b*, . . . , or 280-1, 280-2, . . . ) and to allocate fetched fragments to local fragment groups (280-*a*, 280-*b*, . . . , or 280-1, 280-2, . . . ). For example, when local fragment groups contain a predetermined number, N, of fragments, mapping protocol 270** includes a N:1 mapping that determines in which local fragment group a fragment falls.

Furthermore, the fragments included in local fragment group **280-*j* can be stored in an electronic document. A format of local fragment group 280-*j* can be an electronic document including a sequence of fragments and, optionally, a data structure corresponding to mapping protocol 270. In this specification, an electronic document (which for brevity will simply be referred to as a document) may, but need not, correspond to a file. A document may be stored in a portion of a file that holds other documents, in a single file dedicated to the document in question, or in multiple coordinated files. Storing the fragments of local fragment group 280-*j* in a corresponding single file can advantageously reduce the total file load on a file system of media cache server system 220. Examples of mapping protocol 270 are described below in connection with FIGS. 4 and 5**.

Figure 3:
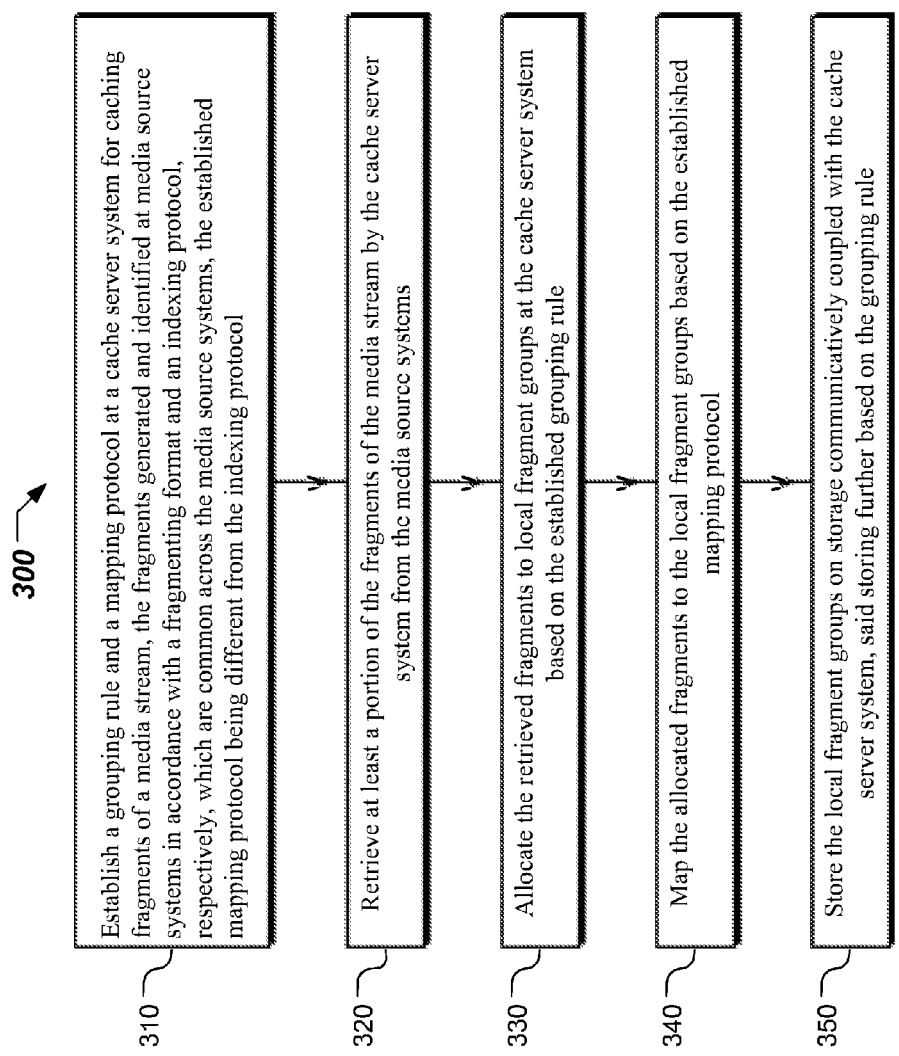
FIG. 3 shows an example of a method for caching media stream fragments.

FIG. 3 shows an example of a method 300 for caching media stream fragments. Method 300 can be implemented, for example, at media cache server system 220. Additionally, method 300 can be implemented at any of media cache server systems 120 of content delivery network 100. Method 300 includes establishing 310 a grouping rule and a mapping protocol at a cache server system for caching fragments of a media stream. As discussed above, the media stream includes a timed-sequence of key frames and intermediate frames of video. Further, the fragments are generated at media source systems in accordance with a fragmenting format that is common to all media source systems. Furthermore, the generated fragments are identified according to an indexing protocol that is common across the media source systems. Moreover, the mapping protocol is established 310, by the cache server system, to be different from the indexing protocol common to the media source systems.

For example, the cache server system can create its own local index tables based on fragment requests coming from multiple clients. To avoid large numbers (e.g., millions) of individual movie fragments being stored separately as HTTP objects in a local storage device, the cache server system can use information in a uniform resource locator (URL) to aggregate movie fragments from a same movie, as described below in this specification. However, this local aggregation rule can correspond to a local mapping protocol that need not be identical to an indexing protocol used by the media source servers. Therefore, a locally created index can be non-exhaustive, unlike an exhaustive index maintained at the media source servers. An example of such non-exhaustive local index can be generated by the cache server system based on an order in which requests from multiple client player devices have come in. Other examples of mapping protocols are described below in this specification. Moreover, a mapping protocol established by a cache server system can advantageously result in a sparse index table to be used by the cache server system to allocate and retrieve fragments.

Method 300 includes retrieving 320 the fragments of the media stream by the cache server system from the media source systems. As discussed above, media fragments generated based on method 135 can be fetched from any of the media source systems. For example, the locally established indexing protocol can be used by the cache server system to preemptively fetch fragments of a media stream.

Method 300 further includes allocating 330 the retrieved fragments to local fragment groups at the cache server system based on the established grouping rule, and mapping 340, by the cache server system, the allocated fragments to the local fragment groups based on the established mapping protocol.

Method 300 can further include storing 350 the local fragment groups on storage communicatively coupled with the cache server system. Storing 350 the local fragment groups can be performed by the cache server system based on the grouping rule. Further, the cache server system can store the local fragment groups in accordance with predetermined retention protocols. For example, a time for which the cache server system caches a local fragment group can be predetermined by a value called the time to live (TTL) that is associated with the cache server system or that is common across media cache server systems 120 of content delivery network 100.

Figure 4:
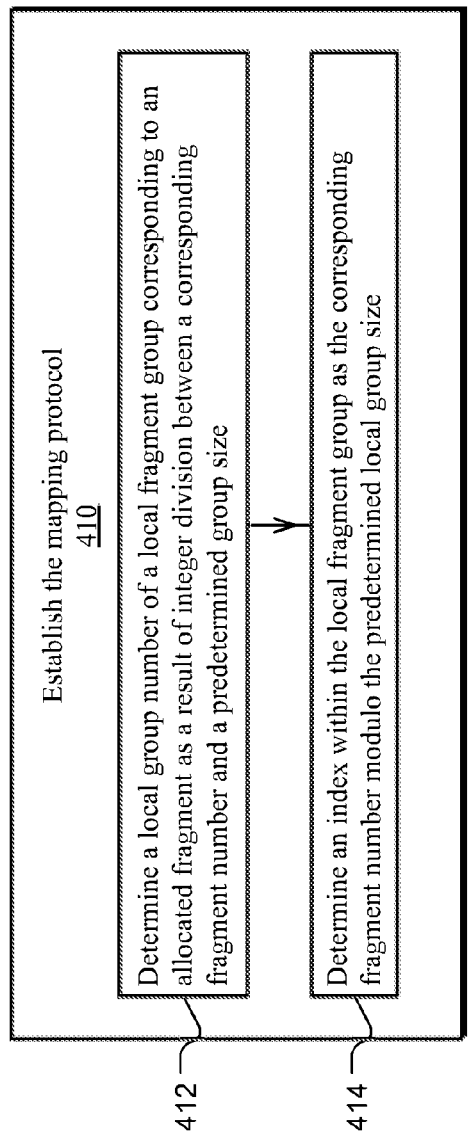
FIGS. 4 and 5 show aspects of the method for caching media stream fragments.

FIG. 4 shows aspects of method 300 for caching media stream fragments. Method 410 for establishing the mapping protocol by the cache server system can be implemented in situations when fragments of a media stream are identified by corresponding fragment numbers, F, and when a size of a local fragment group is a predetermined number of fragments, N. For example, a media stream of duration 120 scan be fragmented by media source systems in 30 fragments, having fragment numbers F=1, 2, . . . , 30, each fragment having a duration of 4 s. A local fragment group can include, e.g., N=6 fragments. A fragment's number can be extracted by the cache server system from the fragment's path. For example, for a fragment that has a fragment path "/media/news/07July2007_9_00/seg21/frag19", the fragment number is extracted to be 19.

Method 410 includes determining 412, by cache server system, a local group number, G, of a local fragment group corresponding to an allocated fragment as a result of integer division between a corresponding fragment number, F, and a predetermined group size, N. For the above example, fragment 19 is allocated by cache server system to group 3. (19 div 6=3.)

Method 410 further includes determining 414, an index within the local fragment group as the corresponding fragment number modulo the predetermined group size. For the above example, fragment 19 is found by cache server system to have an index of 1 within Group 3. (19 mod 6=1.) Further for the above example, to cache the entire media stream, the cache server system can create 5 groups having respective group numbers G=0, 1, 2, 3, 4, corresponding to "F div 6", where F=1, . . . , 30. Furthermore, indexes associated with fragments within each of the 5 groups are 1, 2, 3, 4, 5, 0, corresponding to "F mod 6", where F=1, . . . , 30.

A method similar to method 400 can be used by the cache server system to handle the inverse situation of locating a fragment requested by a client player device from among fragments cached in the local fragment groups stored on local storage devices. For the above example, the client player device may request fragment 27. Then, the cache server system can determine that fragment 27 has an index 3 within group 4. (27 div 6=4, and 27 mod 6=3.)

Figure 5:
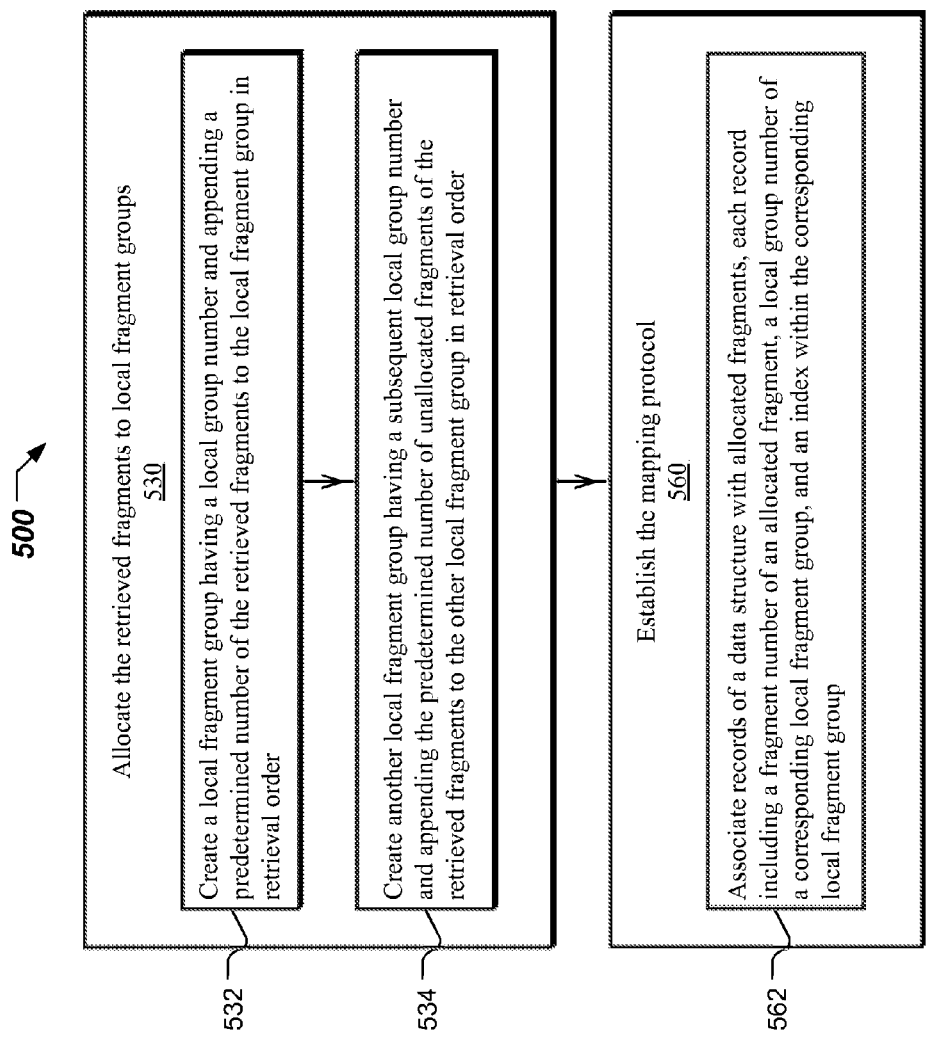

FIG. 5 shows an example of method 500 for caching media stream fragments. Once again, the fragments of the media stream can be identified by corresponding fragment numbers, F, and the local fragment groups can be identified by corresponding local group numbers, G. Method 500 includes allocating 530 the fragments retrieved from the media source systems to local fragment groups. Allocating 530 the retrieved fragments can include creating 532, by the cache server system a local fragment group having a local group number G and appending a predetermined number N of fragments from among the retrieved fragments to the local fragment group in retrieval order. In this implementation, the cache server system appends the fragments to a local fragment group in the order in which they are requested. The local fragment group number can be for example G=2. Then, once the size of the local fragment group 2 exceeds a certain number of fragments (e.g., N=10), a new local fragment group 3 can be started.

Thus, allocating 530 further includes creating 534 another local fragment group having a subsequent local group number and appending the predetermined number of fragments from among unallocated fragments of the retrieved fragments to the other local fragment group in retrieval order. For the above example, the next ten fragments retrieved from the media source systems in response to requests from the client player devices can be cached in group 3 in retrieval order, and so on and so forth.

In an alternative implementation, creating 532 and 534 the new local fragment groups upon exceeding a predetermined number of fragments per group, the condition that triggers creating 532 and 534 of new local fragment groups can be replaced from exceeding a predetermined number of fragments per local fragment group (as described above) with exceeding a predetermined size of a document including a local fragment group.

Method 500 also includes establishing 560 the mapping protocol corresponding to allocating 530 the retrieved fragments. Establishing 560 includes associating 562 records of a data structure with allocated fragments, such that each record includes a unique identification of an allocated fragment, a local group number of a corresponding local fragment group, and an index within the corresponding local fragment group. For example, the data structure can be a hash table for locating a fragment requested by a client player device. For example, a record of the hash table can include a fragment path (e.g., /media/news/07July2007_9_00/seg21/frag19, to uniquely identify a fragment number and the media stream to which the fragment belongs), and an index 4 within group 1. Additional implementations of grouping rules are described below.

In some implementations, local fragment groups can be formed by the cache server system from fragments that have been preemptively retrieved from the media source systems. The preemptively retrieved fragments can have fragment numbers following a fragment number requested by a client player device. The preemption criterion can be a recorded usage (e.g., viewing) pattern of the requesting client. For given client player devices, the cache server system may request 2 to 5 fragments following the fragment currently requested by the given clients. In the some implementations, either a modulo-map (as described in method 410) or a hash table (as described in aspect 562 of method 500) can be used for mapping the allocated fragments. Further, if the local fragment groups are created 532 and 534 by appending fragments to an incomplete group, then a group size can be set to equal a number of fragments requested preemptively for optimizing seeks of a streaming media stream.

In other implementations, local fragment groups can be formed by the cache server system from the retrieved fragments of a media stream corresponding to a media asset (e.g., a movie, show, multimedia event, etc.) based on audience popularity of the allocated fragments. In addition, local fragment groups that include popular fragments can be stored on a fast access storage device (e.g., memory), while local fragment groups that include unpopular fragments can be stored on a slow access storage device (e.g., hard drive). In the current implementations, either a modulo-map (as described in method 410) or a hash map (as described in aspect 562 of method 500) can be used for mapping the allocated fragments. Moreover, fragments that are determined to have become more popular can be promoted to local fragment groups that are stored on fast access storage devices, e.g., on memory as opposed to disk. A popularity indicator can be, for example, a number of times a given fragment has been requested by client player devices. In the current implementations, the fragments deemed popular can be moved to groups stored on fast access storage devices based on frequency of access. In such cases, the corresponding index tables or hash tables are adjusted to reflect the move.

In some implementations, local fragment groups can be formed by the cache server system from the retrieved fragments of a media stream representing a media asset. Fragments that are grouped together can correspond to a same scene and are encoded at different bit rates. In the some implementations, either a modulo-map (as described in method 410) or a hash map (as described in aspect 562 of method 500) can be used for mapping the allocated fragments. For example, media source systems can maintain copies of a given movie encoded at five different bit-rates—very low, low, medium, high, and very high. A cache server system can fetch from the media source systems a copy, encoded at a specified bitrate, of a fragment representing a given scene in response to a request from a client player device. However, the cache server system can be configured to additionally fetch existing copies encoded at the other, different bit-rates of the fragment representing the given scene. In such situation, the cache server system can form a local fragment group that includes the five copies encoded at different bit-rates of the requested fragment.

In some implementations, local fragment groups can be formed by the cache server system from the retrieved fragments of multiple media assets, e.g., of several movies. In these implementations, a rule for allocating fragments to groups based on fragment popularity can be further relaxed to allow for grouping, in a given group, fragments from different media assets. A hash map (as described in aspect 562 of method 500) can be used for mapping the allocated fragments, for instance.

In some implementations, the cache server system can establish the grouping rule as a weighted combination of some of the rules described above. For example, local fragment groups can be formed based on a weighted grouping criterion including at least two of (i) popularity of a media asset (e.g., a certain group can include fragments from two or more movies having different popularities); (ii) fragment timing within an asset (e.g., the first 6 minutes of a show tend to be more popular than the remaining duration of a 30 minute sitcom show); (iii) popularity of the fragments (corresponding to popular scenes a given episode of a show); (iv) encoding bit rate of the fragments (fragments encoded at medium bit-rate tend to be requested more often than fragments encoded at lower or higher bit-rates); and (v) a storage medium's I/O speed (fast access storage devices tend to be preferred to slow access storage devices). A hash map (as described in aspect 562 of method 500) can be used for mapping the allocated fragments, for instance.

Figure 6:
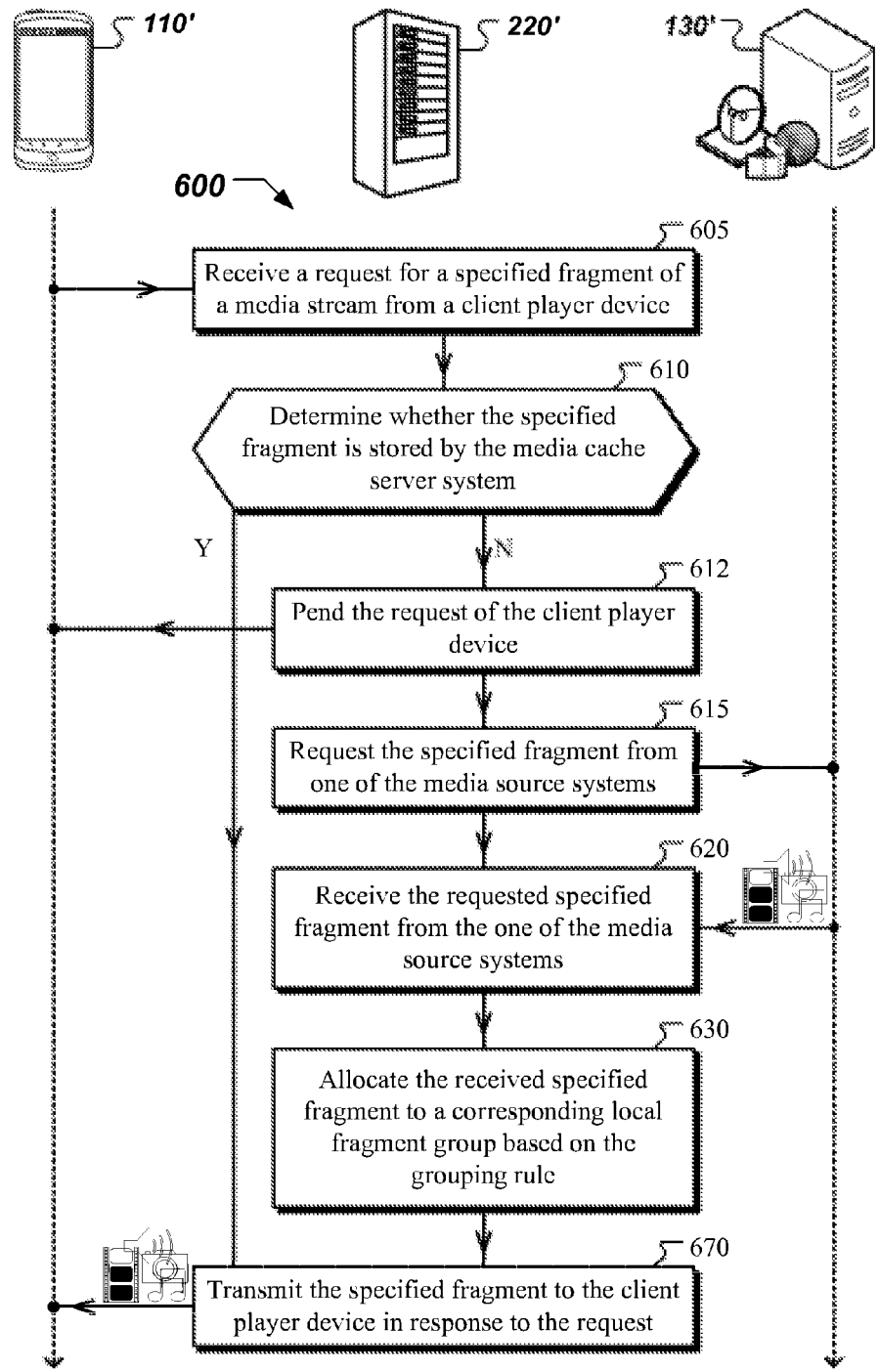
FIG. 6 shows an example of another method for caching media stream fragments.

FIG. 6 shows an example of another method 600 for caching media stream fragments. Method 600 can be implemented, for example, at media cache server system 220, and at any of media cache server systems 120. Method 600 includes receiving 605, at a media cache server system 220', a request for a specified fragment from a client player device 110'.

Method 600 includes determining 610 whether the specified fragment is stored by cache server system 220'. The received fragment request can be used by media cache server system 220' to construct a path to a corresponding local fragment group. For example, if the fragment resource name is /media/news/07July2007_9_00/seg21/frag19, media cache server system 220' can extract the fragment number, F=19. Further, media cache server system 220' can use a locally established mapping protocol to determine a local fragment group that the requested fragment belongs to. As discussed above in connection with FIG. 4, the mapping protocol can be a modulo function, "local group number" (G)="fragment number" (F) modulo "local group size" (N).

If media cache server system 220' determines that the local fragment group exists and further that it includes the requested fragment, then method 600 includes transmitting 670 the specified fragment to client player device 110' in response to the request. If, however, media cache server system 220' determines that the local fragment group exists, but that the system 220' lacks the requested fragment, or if media cache server system 220' cannot find the determined local fragment group, then method 600 includes pending 612 the request of client player device 110'. Pending 612 can optionally include notifying client player device 110' of a potential delay in retrieving the requested fragment. Media cache server system 220' can transmit a notification message to this effect back to client player device 110'. Further, method 600 includes requesting 615 the specified fragment by media cache server system 220' from one of media source systems 130'.

Method 600 continues with media cache server system 220' receiving 620 the requested fragment from the one of the media source systems 130'. Method 600 further includes allocating 630 the received fragment to the local fragment group that the requested fragment belongs to in accordance with the grouping rule. If cache server system 220' cannot find the local fragment group that the requested fragment belongs to, then method 600 can create the local fragment group before allocating 630 the requested fragment to the newly created local fragment group. Allocating 630 optionally includes updating an entry of a data structure corresponding to the local fragment group to which the requested fragment is allocated. Moreover, the allocating 630 aspect of method 600 can be implemented, for example, by applying aspects of methods 300, 410 and 500 described above in connection with FIGS. 3-5.

Method 600 further continues with media cache server system 220' transmitting 670 the specified fragment to client player device 110' in response to the pending request.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. In a digital medium environment to cache digital content for efficient user access of the digital content, a cache server system comprising:
    a network interface;
    a processor; and
    memory, the memory comprising instructions that are executable by the processor to configure the cache server system to:
        establish a grouping rule and a mapping protocol for caching fragments of a media stream that includes a timed-sequence of video frames, the fragments generated and identified at a plurality of media source systems in accordance with a fragmenting format and an indexing protocol, respectively, which are common across the plurality of media source systems, the established mapping protocol being different from the indexing protocol;
        retrieve at least a portion of the fragments of the media stream from one or more of the plurality of the media source systems via the network interface;
        allocate the retrieved fragments to local fragment groups based on the established grouping rule; and
        map the allocated fragments to the local fragment groups based on the established mapping protocol, the mapping protocol creating a sparse index table corresponding to received requests for the allocated fragments.

2. The system of claim 1, wherein the fragments of the media stream are identified by corresponding fragment numbers, the local fragment groups are identified by corresponding local group numbers, and to establish the mapping protocol, the instructions are executable to configure cache server system to:
    determine a local group number of the local fragment group corresponding to an allocated fragment as a result of integer division between a corresponding fragment number and a predetermined group size; and
    determine an index within the local fragment group as the corresponding fragment number modulo the predetermined group size.

3. The system of claim 1, wherein the fragments of the media stream are identified by the corresponding fragment numbers, the local fragment groups are identified by corresponding local group numbers, and to allocate the retrieved fragments, the instructions are executable to configure cache server system to:
    create the local fragment group having the local group number and append a predetermined number of fragments from among the retrieved fragments to the local fragment group in retrieval order; and
    create another local fragment group having a subsequent local group number and append the predetermined number of fragments from among unallocated fragments of the retrieved fragments to the other local fragment group in retrieval order, and the establishment of the mapping protocol comprising:
        associating records of a data structure with the allocated fragments, each record comprising the fragment number of the allocated fragment, the local group number of a corresponding local fragment group, and the index within the corresponding local fragment group.

4. The system of claim 1, the instructions being further executable by the processor to configure cache server system to establish the grouping rule for the allocation to form the local fragment groups from the fragments that have been preemptively retrieved from one or more of the plurality of the media source systems, the preemptively retrieved fragments having the fragment numbers immediately following the fragment number requested by a client.

5. The system of claim 1, the instructions being further executable by the processor to configure cache server system to establish the grouping rule for the allocation to form the local fragment groups from the retrieved fragments of the media stream including a media asset, the retrieved fragments being encoded at different bit rates.

6. The system of claim 1, further comprising:
    one or more storage devices; and
    wherein the instructions are further executable by the processor to configure cache server system to store the local fragment groups, on the one or more storage devices, based on the grouping rule.

7. The system of claim 6, the instructions being further executable by the processor to configure cache server system to:
    establish the grouping rule for the allocation to form the local fragment groups from the retrieved fragments of the media stream including the media asset based on audience popularity of the allocated fragments;
    store the local fragment groups, including popular fragments, to a portion of the one or more storage devices that includes a high speed I/O storage medium, and store the local fragment groups, including unpopular fragments, to another portion of the one or more storage devices that includes a low speed I/O storage medium.

8. The system of claim 7, wherein to establish the grouping rule the instructions are executable by the processor to configure cache server system to establish the grouping rule for the allocation of the fragments of multiple media assets to form groups based on audience popularity of the allocated fragments.

9. The system of claim 6, the instructions being further executable by the processor to configure cache server system to:
establish the grouping rule for the allocation of the fragments of a movie to the local fragment groups; and
store the local fragment groups based on weighted grouping criteria comprising popularity of the movie, fragment positions within the movie, popularity of the fragments, encoding bit rate of the fragments, and a speed of I/O speed of a storage medium.

10. The system of claim 6, the instructions being further executable by the processor to configure cache server system to incorporate the local fragment groups in respective files of a file system of the cache server system.

11. The system of claim 1, the instructions being further executable by the processor to configure cache server system to:
receive a request from a client player device for a specified fragment;
determine whether the specified fragment is stored by the cache server system;
responsive to the determination being positive, transmit the specified fragment to the client player device; and
responsive to the determination being negative:
pend the request of the client player device;
request the specified fragment from one or more of the plurality of the media source systems;
receive the requested specified fragment from one or more of the plurality of the media source systems via the network interface;
allocate the received specific fragment to the corresponding local fragment group based on the grouping rule; and
transmit the specific fragment to the client player device in response to the request.

12. In a digital medium environment to fragment digital content for efficient user access of the digital content, a method implemented by at least one computing device of a media source system, the method comprising:
obtaining, by the at least one computing device, a media stream;
obtaining, by the at least one computing device, time references, the time references corresponding to the obtained media stream;
identifying, by the at least one computing device, key frames in the media stream, each of the identified key frames being a first key frame following a corresponding time reference from among the obtained time references;
generating, by the at least one computing device, fragments of the media stream corresponding to at least a portion of the identified key frames, each of the generated fragments including an associated contiguous sequence of frames starting with the identified key frame;
indexing, by the at least one computing device, the generated fragments in an index file according to an indexing protocol; and
storing, by the at least one computing device, on storage media communicatively coupled with the at least one computing device, the index file and the generated fragments, the generating and the indexing being utilized by a cache server system to establish a grouping rule and a mapping protocol for caching the generated fragments of the media stream, the mapping protocol being different from the indexing protocol, and the media source system communicating with the cache server system and one or more client devices in a content delivery network using hypertext transmission protocol (HTTP) streaming.

13. The method of claim 12, wherein the media stream is obtained from one of: decoding a media file stored on a storage device of the media source system, or receiving the media stream from one or more cameras recording a live event.

14. The method of claim 12, wherein the obtaining the time references comprises generating, by the at least one computing device, a sequence of reference times separated by a predetermined time interval.

15. The method of claim 12, wherein the generating the fragments uses a fragmenting format that is consistent with one or more other media source systems.

16. The method of claim 12, wherein the indexing protocol is common between the media source system and the one or more other media source systems.

17. The method of claim 12, wherein the index file comprises an exhaustive list of names of the fragments generated by the at least one computing device.

18. In a digital medium environment to fragment digital content for efficient user access of the digital content, a media source system comprising:
a storage device;
a processor; and
memory, the memory comprising instructions that are executable by the processor to configure the media source system to:
obtain a media stream;
obtain time references, the time references corresponding to the obtained media stream;
identify key frames in the media stream, each of the identified key frames being a first key frame following a corresponding time reference from among the obtained time references;
generate fragments of the media stream corresponding to at least a portion of the identified key frames, each of the generated fragments including an associated contiguous sequence of frames starting with the identified key frame;
index the generated fragments in an index file according to an indexing protocol; and
store, on the storage device, the index file and the generated fragments, the generation and the indexing being utilized by a cache server system to establish a grouping rule and a mapping protocol for caching the generated fragments of the media stream, the mapping protocol being different from the indexing protocol, and the media source system communicating with the cache server system and one or more client devices in a content delivery network using hypertext transmission protocol (HTTP) streaming.

19. The system of claim 18, further comprising:
a network interface; and
wherein the instructions are further executable by the processor to configure media source system to:

receive a request via the network interface, from the cache server system, for a fragment;

retrieve the requested fragment from the storage device; and transmit the requested fragment to the cache server system via the network interface.

20. The system of claim 18, wherein the fragments are generated using a fragmenting format that is consistent with one or more other media source systems, and wherein the indexing protocol is common between the media source system and the one or more other media source systems.

\* \* \* \* \*